(12) United States Patent
Li et al.

(10) Patent No.: US 10,939,410 B2
(45) Date of Patent: Mar. 2, 2021

(54) COMMUNICATION METHOD, USER EQUIPMENT, AND NETWORK DEVICE

(71) Applicant: Huawei Technologies Co., Ltd., Shenzhen (CN)

(72) Inventors: Chenwan Li, Beijing (CN); Yinghui Yu, Beijing (CN); Baokun Shan, Beijing (CN); Li Chen, Shenzhen (CN); Yiling Wu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/297,130

(22) Filed: Mar. 8, 2019

(65) Prior Publication Data
US 2019/0208503 A1 Jul. 4, 2019

Related U.S. Application Data

(63) Continuation of application No. PCT/CN2016/098614, filed on Sep. 9, 2016.

(51) Int. Cl.
*H04W 48/16* (2009.01)
*H04W 72/00* (2009.01)
(Continued)

(52) U.S. Cl.
CPC ......... *H04W 72/005* (2013.01); *H04W 48/16* (2013.01); *H04W 72/0453* (2013.01);
(Continued)

(58) Field of Classification Search
CPC ........... H04W 74/0833; H04W 74/006; H04W 74/008; H04W 74/08; H04W 48/06;
(Continued)

(56) References Cited

U.S. PATENT DOCUMENTS

2016/0150571 A1  5/2016  Pelletier et al.
2018/0242365 A1* 8/2018  Rathonyi ............ H04W 74/008
(Continued)

FOREIGN PATENT DOCUMENTS

CN       1917694 A    2/2007
CN     101340707 A    1/2009
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.2.0, pp. 1-623, 3rd Generation Partnership Project—Valbonne, France (Jun. 2016).
(Continued)

*Primary Examiner* — Jae Y Lee
*Assistant Examiner* — Aixa A Guadalupe Cruz
(74) *Attorney, Agent, or Firm* — Leydig, Voit & Mayer, Ltd.

(57) ABSTRACT

A communication method applicable to a random access process includes: receiving indication information sent by a network device, where the indication information includes at least one piece of the following information: access probability information of each of a plurality of carriers, access control information of at least one of the plurality of carriers, overload indication information of at least one of the plurality of carriers, power boost information of at least one of the plurality of carriers, and access indication information of one of the plurality of carriers; and determining, based on the indication information, one carrier from the plurality of carriers as a target carrier to perform random access.

16 Claims, 7 Drawing Sheets

(51) Int. Cl.
*H04W 74/08* (2009.01)
*H04W 74/00* (2009.01)
*H04W 72/04* (2009.01)
*H04W 72/12* (2009.01)
*H04W 48/06* (2009.01)

(52) U.S. Cl.
CPC ..... *H04W 74/008* (2013.01); *H04W 74/0833* (2013.01); *H04W 48/06* (2013.01); *H04W 72/121* (2013.01); *H04W 72/1231* (2013.01)

(58) Field of Classification Search
CPC ........... H04W 72/1231; H04W 72/121; H04W 48/16; H04B 17/327
See application file for complete search history.

(56) References Cited

U.S. PATENT DOCUMENTS

2019/0028960 A1* 1/2019 Wong .................... H04B 17/327
2020/0187256 A1* 6/2020 Lim ..................... H04W 72/042

FOREIGN PATENT DOCUMENTS

| CN | 101516064 A | 8/2009 |
| CN | 101815344 A | 8/2010 |
| CN | 102763481 A | 10/2012 |
| CN | 102958132 A | 3/2013 |
| WO | 2007052971 A1 | 5/2007 |
| WO | 2010030935 A2 | 3/2010 |
| WO | 2011041926 A1 | 4/2011 |
| WO | 2013026184 A1 | 2/2013 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.2.0, pp. 1-91, 3rd Generation Partnership Project—Valbonne, France (Jun. 2016).
CN/2016800891056, Search Report, dated Feb. 25, 2020.

* cited by examiner

| User equipment | Base station | Core network device |

Receive indication information sent by a network device, where the indication information includes at least one piece of the following information: access probability information of each of a plurality of carriers, access control information of at least one of the plurality of carriers, overload indication information of at least one of the plurality of carriers, power boost information of at least one of the plurality of carriers, and access indication information of one of the plurality of carriers — 210

Determine, based on the indication information, one carrier from the plurality of carriers as a target carrier to perform random access — 220

FIG. 2

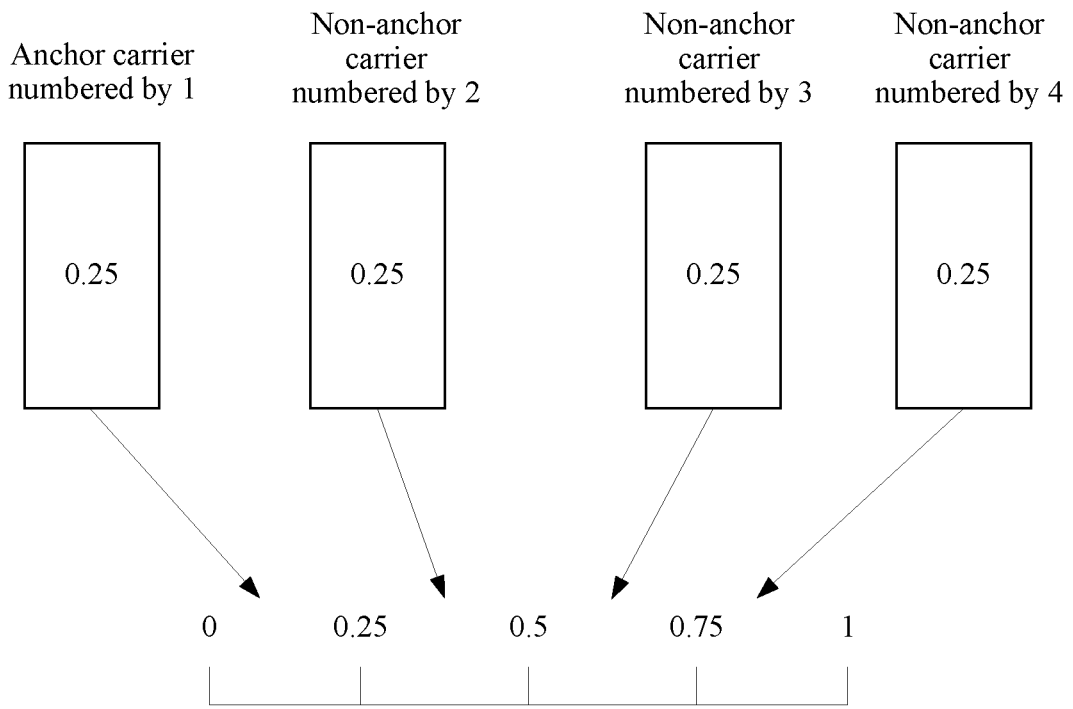

Determine indication information of at least one of a plurality of carriers, where the indication information includes at least one piece of the following information: access probability information of the carrier, access control information of the carrier, overload indication information of the carrier, power boost information of the carrier, and access indication information of the carrier ⎯ 610

Send the indication information of the at least one carrier ⎯ 620

FIG. 6

COMMUNICATION METHOD, USER EQUIPMENT, AND NETWORK DEVICE

CROSS-REFERENCE TO RELATED APPLICATIONS

This application is a continuation of International Application No. PCT/CN2016/098614, filed on Sep. 9, 2016, the disclosure of which is hereby incorporated by reference in its entirety.

TECHNICAL FIELD

Embodiments of the present application relate to the communications field, and more specifically, to a communication method, user equipment, and a network device.

BACKGROUND

With rapid development of wireless communications, people are no longer satisfied with only person-to-person communication. Therefore, an Internet of Things (IoT) technology emerges, and market demand thereof grows rapidly. An important development direction of the IoT is machine-to-machine (M2M) communication, and M2M means that information and data are mutually transmitted between machines through a wireless network. Most M2M devices are relatively compact battery-powered systems, such as an intelligent meter reading system, which needs to periodically monitor and report usage of water, electricity, gas, or the like. In M2M communication, a machine type communication (MTC) service has some special service features: a small amount of transmitted data, an obvious service periodicity, low power consumption, and a large terminal quantity.

In the Narrowband Internet of Things Release 13 (NB-IoT Rel-13), only a physical downlink control channel (PDCCH) and a physical downlink shared channel (PDSCH) are configured on a non-anchor carrier, and this cannot balance load of random access. In an M2M communications system, there are a large quantity of users, and a random access resource and a paging capacity are limited. Therefore, the Rel-14 proposes that a non-anchor carrier also needs to support random access and paging. For the random access, when a plurality of carriers support the random access, how user equipment selects an access carrier (to be specific, selects a resource) in a random access process and how a network side performs resource configuration are problems to be urgently resolved.

SUMMARY

Embodiments of the present application provide a communication method for selecting a carrier in a random access process.

According to a first aspect, a communication method is provided, where the method is applied to a random access process and includes: receiving indication information sent by a network device, where the indication information includes at least one piece of the following information: access probability information of each of a plurality of carriers, access control information of at least one of the plurality of carriers, overload indication information of at least one of the plurality of carriers, power boost information of at least one of the plurality of carriers, and access indication information of one of the plurality of carriers; and determining, based on the indication information, one carrier from the plurality of carriers as a target carrier to perform random access.

Therefore, by receiving the indication information sent by the network device and determining, based on the indication information, the carrier for performing random access, user equipment can determine the target carrier from the plurality of carriers to perform random access, thereby facilitating load balancing.

With reference to the first aspect, in a first possible implementation of the first aspect, the indication information is carried in broadcast signaling, and the broadcast signaling includes one of the following: a master information block MIB, a system information block SIB 1, a system information block SIB 2, and a system information block SIB 14.

With reference to the first aspect and the foregoing implementation of the first aspect, in a second possible implementation of the first aspect, the indication information is carried in dedicated signaling, and the dedicated signaling includes one of the following: a radio resource control (RRC) protocol connection reconfiguration message, an RRC connection setup message, an RRC connection release message, and a downlink direct transfer message.

With reference to the first aspect and the foregoing implementations of the first aspect, in a third possible implementation of the first aspect, the indication information includes an access probability of at least one of the plurality of carriers, and the determining, based on the indication information, one carrier from the plurality of carriers as a target carrier to perform random access includes: generating a random number a, where a is a non-negative rational number; and determining, based on a correspondence between the random number a and a probability interval constituted of access probabilities of the plurality of carriers, the target carrier to perform random access.

With reference to the first aspect and the foregoing implementations of the first aspect, in a fourth possible implementation of the first aspect, the indication information includes probability information of each of the plurality of carriers, a quantity of the plurality of carriers is n, an access probability of an $i^{th}$ carrier in the n carriers is $P(i)$, $1 \le i \le n$, $0 \le a \le 1$, a sum of the access probabilities of the n carriers is 1, and the determining, based on a correspondence between the random number a and a probability interval constituted of access probabilities of the plurality of carriers, the target carrier to perform random access includes: when $0 \le a < P(1)$, selecting a first carrier in the n carriers as the target carrier to perform random access; when $a = P(1)$, selecting a first carrier or a second carrier in the n carriers as the target carrier to perform random access; when $P(1) + \ldots + P(j) < a < P(1) + \ldots + P(j+1)$, selecting a $(j+1)^{th}$ carrier in the n carriers as the target carrier to perform random access; or when $P(1) + \ldots + P(j) = a$, selecting a $j^{th}$ or a $(j+1)^{th}$ carrier in then carriers as the target carrier to perform random access, where $1 < j \le n$, and n is a positive integer.

With reference to the first aspect and the foregoing implementations of the first aspect, in a fifth possible implementation of the first aspect, the determining, based on a correspondence between the random number a and a probability interval constituted of access probabilities of the plurality of carriers, the target carrier to perform random access includes: regenerating a random number a when the $j^{th}$ carrier is a carrier with access control; and selecting, based on the regenerated random number a, one carrier from the plurality of carriers as the target carrier to perform random access.

With reference to the first aspect and the foregoing implementations of the first aspect, in a sixth possible implementation of the first aspect, the $j^{th}$ carrier is an anchor carrier with access control.

With reference to the first aspect and the foregoing implementations of the first aspect, in a seventh possible implementation of the first aspect, there is at least one carrier with access control in the plurality of carriers, the indication information includes the probability information of each of the plurality of carriers, a sum of a probability of the at least one carrier with access control is $P_0$, a quantity of carriers other than the carrier with access control in the plurality of carriers is m, a sum of access probabilities of them carriers is $1-P_0$, $0 \le a \le 1-P_0$, and the determining, based on a correspondence between the random number a and a probability interval constituted of access probabilities of the plurality of carriers, the target carrier to perform random access includes: when $0 \le a < P(1)$, selecting a first carrier in the m carriers as the target carrier to perform random access; when $a=P(1)$, selecting a first carrier or a second carrier in the m carriers as the target carrier to perform random access; when $P(1)+ \ldots +P(0) < a < P(1)+ \ldots +P(j+1)$, selecting a $(j+1)^{th}$ carrier in the m carriers as the target carrier to perform random access; or when $P(1)+ \ldots +P(j)=a$, selecting a $j^{th}$ or a $(j+1)^{th}$ carrier in the m carriers as the target carrier to perform random access, where $1 < j \le m$, and m is a positive integer.

With reference to the first aspect and the foregoing implementations of the first aspect, in an eighth possible implementation of the first aspect, the at least one carrier with access control is an anchor carrier, the indication information includes the probability information of each of the plurality of carriers, an access probability of the anchor carrier with access control is $P_0$, a quantity of carriers other than the anchor carrier with access control in the plurality of carriers is p, and a sum of access probabilities of the p carriers is $1-P_0$.

With reference to the first aspect and the foregoing implementations of the first aspect, in a ninth possible implementation of the first aspect, $0 \le a \le 1$, there is the at least one carrier with access control in the plurality of carriers, the indication information includes probability information of each carrier without access control in the plurality of carriers, a quantity of carriers without access control in the plurality of carriers is p, a sum of access probabilities of the p carriers is 1, and the determining, based on a correspondence between the random number a and a probability interval constituted of access probabilities of the plurality of carriers, the target carrier to perform random access includes: when $0 \le a < P(1)$, selecting a first carrier in the p carriers as the target carrier to perform random access; when $a=P(1)$, selecting a first carrier or a second carrier in the p carriers as the target carrier to perform random access; when $P(1)+ \ldots +P(j) < a < P(1)+ \ldots +P(j+1)$, selecting $j^{th}$ carrier in the p carriers as the target carrier to perform random access; or when $P(1)+ \ldots +P(j)=a$, selecting a $j^{th}$ or a $(j+1)^{th}$ carrier in the p carriers as the target carrier to perform random access, where $1 < j \le p$, and p is a positive integer.

Therefore, when a carrier performs access control on the user equipment (UE), the method in this embodiment of the present application may help the UE to select a carrier without access control, to implement load balancing, and a load status of each carrier may also be considered for access.

With reference to the first aspect and the foregoing implementations of the first aspect, in a tenth possible implementation of the first aspect, the at least one carrier with access control is an anchor carrier, the indication information includes probability information of each non-anchor carrier in the plurality of carriers, a quantity of non-anchor carriers without access control in the plurality of carriers is q, and a sum of access probabilities of the q non-anchor carriers is 1, where q is a positive integer.

With reference to the first aspect and the foregoing implementations of the first aspect, in an eleventh possible implementation of the first aspect, the determining, based on the indication information, one carrier from the plurality of carriers as a target carrier to perform random access includes: when an anchor carrier in the plurality of carriers does not perform access control, selecting the anchor carrier as the target carrier to perform random access.

With reference to the first aspect and the foregoing implementations of the first aspect, in a twelfth possible implementation of the first aspect, the indication information includes access control information of an anchor carrier in the plurality of carriers, and the determining, based on the indication information, one carrier from the plurality of carriers as a target carrier to perform random access includes: selecting the target carrier from non-anchor carriers other than the anchor carrier in the plurality of carriers to perform random access.

With reference to the first aspect and the foregoing implementations of the first aspect, in a thirteenth possible implementation of the first aspect, the indication information includes access control information of the plurality of carriers and overload indication information of the plurality of carriers, and the determining, based on the indication information, one carrier from the plurality of carriers as a target carrier to perform random access includes: selecting, as the target carrier to perform random access, one carrier from carriers other than the carrier that performs access control and the carrier that performs an overload indication in the plurality of carriers, where r is a positive integer.

Therefore, the UE may perform random access on a carrier other than the carrier that performs access control on the UE and an overloaded carrier. In this way, a success probability of random access can be increased.

With reference to the first aspect and the foregoing implementations of the first aspect, in a fourteenth possible implementation of the first aspect, the indication information includes access control information of an anchor carrier in the plurality of carriers and overload indication information of k non-anchor carriers in the plurality of carriers, and the determining, based on the indication information, one carrier from the plurality of carriers as a target carrier to perform random access includes: selecting, as the target carrier to perform random access, one carrier from carriers other than the anchor carrier that performs access control and the k non-anchor carriers that perform an overload indication in the plurality of carriers, where k is a positive integer.

With reference to the first aspect and the foregoing implementations of the first aspect, in a fifteenth possible implementation of the first aspect, the indication information includes access control information of an anchor carrier in the plurality of carriers and overload indication information of each non-anchor carrier in the plurality of carriers, and the selecting, based on the indication information, one carrier from the plurality of carriers as a target carrier to perform random access includes: selecting one carrier from the non-anchor carriers in the plurality of carriers as the target carrier to perform random access.

With reference to the first aspect and the foregoing implementations of the first aspect, in a sixteenth possible implementation of the first aspect, the indication information includes access control information of s carriers in the plurality of carriers, and the determining, based on the indication information, one carrier from the plurality of carriers as a target carrier to perform random access includes: selecting one carrier from carriers other than the s carriers in the plurality of carriers as the target carrier to perform random access, where s is a positive integer.

It should be understood that a manner of selecting the target carrier from the carriers other than the s carriers in the plurality of carriers may be randomly selecting the target carrier from the carriers other than the carrier with access control, or may be determining, based on the correspondence between the random number a and the probability interval constituted of the access probabilities of the plurality of carriers, the target carrier to perform random access.

With reference to the first aspect and the foregoing implementations of the first aspect, in a seventeenth possible implementation of the first aspect, the s carriers with access control include s−1 non-anchor carriers, and access control information of the non-anchor carriers is simplified access control indication information.

With reference to the first aspect and the foregoing implementations of the first aspect, in an eighteenth possible implementation of the first aspect, the simplified access control indication information is carried in a bitmap.

It should be understood that the information carried in the bitmap is used to indicate that access of one or more categories of user equipment is controlled. Therefore, categories of UEs on which the carriers perform access control may be different, so that different categories of UEs each have an opportunity to perform random access.

With reference to the first aspect and the foregoing implementations of the first aspect, in a nineteenth possible implementation of the first aspect, the indication information includes power boost indication information of t carriers in the plurality of carriers, and the determining, based on the indication information, one carrier from the plurality of carriers as a target carrier to perform random access includes: selecting one carrier from the t carriers as the target carrier to perform random access, where t is a positive integer.

With reference to the first aspect and the foregoing implementations of the first aspect, in a twentieth possible implementation of the first aspect, the indication information includes the access indication information of one of the plurality of carriers, and the determining, based on the indication information, one carrier from the plurality of carriers as a target carrier to perform random access includes: selecting a carrier corresponding to the access indication information as the target carrier to perform random access.

According to a second aspect, a communication method is provided, including: determining indication information of at least one of a plurality of carriers, where the indication information includes at least one piece of the following information: access probability information of the carrier, access control information of the carrier, overload indication information of the carrier, power boost information of the carrier, and access indication information of the carrier; and sending the indication information of the at least one carrier.

With reference to the second aspect, in a first possible implementation of the second aspect, the indication information is carried in broadcast signaling, and the broadcast signaling includes one of the following: a master information block MIB, a system information block SIB 1, a system information block SIB 2, and a system information block SIB 14.

With reference to the second aspect and the foregoing implementation of the second aspect, in a second possible implementation of the second aspect, the indication information is carried in dedicated signaling, and the dedicated signaling includes one of the following: a radio resource control (RRC) protocol connection reconfiguration message, an RRC connection setup message, an RRC connection release message, and a downlink direct transfer message.

With reference to the second aspect and the foregoing implementations of the second aspect, in a third possible implementation of the second aspect, a sum of access probabilities of the plurality of carriers is 1.

With reference to the second aspect and the foregoing implementations of the second aspect, in a fourth possible implementation of the second aspect, a sum of probabilities of carriers other than a carrier with access control in the plurality of carriers is 1.

With reference to the second aspect and the foregoing implementations of the second aspect, in a fifth possible implementation of the second aspect, the access control information of the carrier is simplified access control indication information.

With reference to the second aspect and the foregoing implementations of the second aspect, in a sixth possible implementation of the second aspect, the simplified access control information is carried in a bitmap.

According to a third aspect, user equipment is provided, and is configured to perform the method in the first aspect or any possible implementation of the first aspect. Specifically, the user equipment includes a unit configured to perform the method in the first aspect or any possible implementation of the first aspect.

According to a fourth aspect, a network device is provided, and is configured to perform the method in the second aspect or any possible implementation of the second aspect. Specifically, the apparatus includes a unit configured to perform the method in the second aspect or any possible implementation of the second aspect.

According to a fifth aspect, an apparatus is provided, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive and/or send a signal. In addition, when the processor executes the instruction stored in the memory, the execution enables the processor to perform the method in the first aspect or any possible implementation of the first aspect.

According to a sixth aspect, an apparatus is provided, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and/or send a signal. In addition, when the processor executes the instruction stored in the memory, the execution enables the processor to perform the method in the second aspect or any possible implementation of the second aspect.

According to a seventh aspect, a computer-readable medium is provided, and is configured to store a computer program. The computer program includes an instruction used to perform the method in the first aspect or any possible implementation of the first aspect.

According to an eighth aspect, a computer-readable medium is provided, and is configured to store a computer program. The computer program includes an instruction used to perform the method in the second aspect or any possible implementation of the second aspect.

BRIEF DESCRIPTION OF DRAWINGS

FIG. 1 is a schematic diagram of an application scenario according to an embodiment of the present application;

FIG. 2 is a schematic flowchart of a method according to an embodiment of the present application;

FIG. 5 is a schematic diagram of a method according to another embodiment of the present application;

FIG. 6 is a schematic flowchart of a method according to another embodiment of the present application;

DESCRIPTION OF EMBODIMENTS

Figure 3:
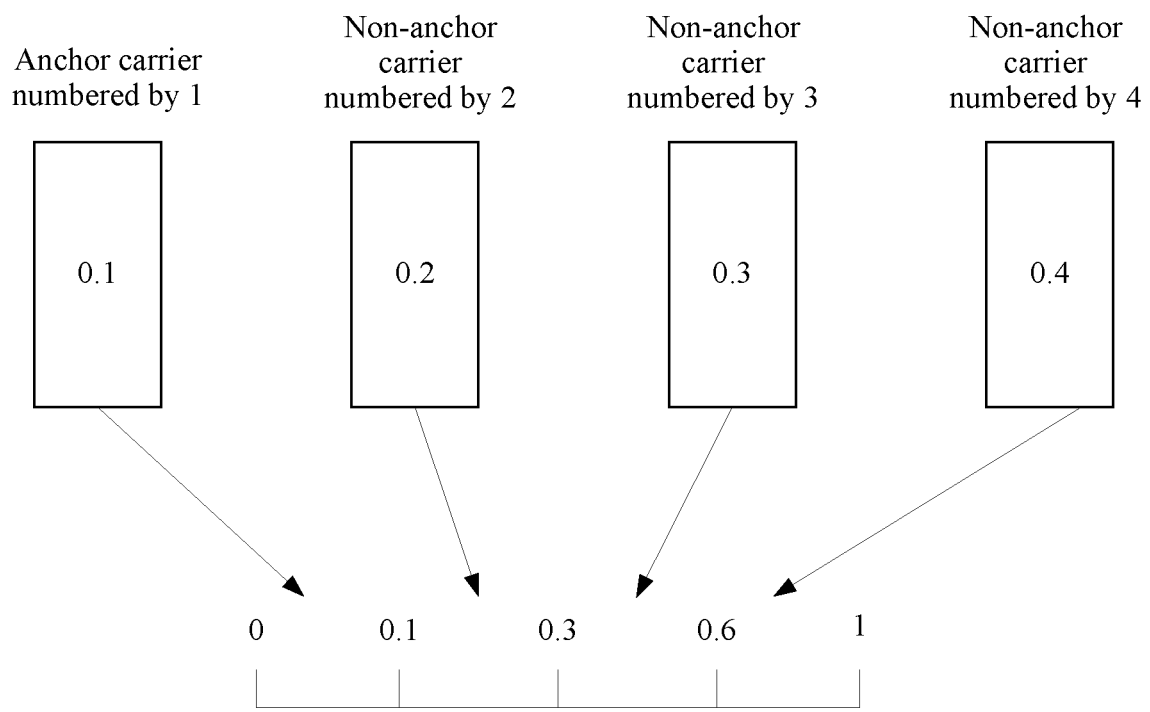
FIG. 3 is a schematic diagram of a method according to an embodiment of the present application.

FIG. 1 is a schematic diagram of an application scenario according to an embodiment of the present application. As shown in the figure, the figure is a schematic diagram of interaction between user equipment, a base station, and a core network.

Technical solutions in embodiments of the present application may be applied to MTC scenarios in various communications systems. The various communications systems may be an M2M communications system, an enhanced machine type communication (eMTC) system, a Narrowband Internet of Things (NB-IoT) communications system, a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and the like.

The user equipment (UE) in this embodiment of the present application indicates a terminal device that supports communication types such as M2M, eMTC, NB (narrowband)-IoT, and LTE, and the UE may be an MTC device, or may be normal UE that performs an MTC service. The UE may be referred to as a terminal, a mobile station (MS), a mobile terminal, and the like. The user equipment may communicate with one or more core networks by using a radio access network (RAN). For example, the user equipment may be a mobile phone (or referred to as a "cellular phone") or a computer with a mobile terminal. For example, the user equipment may also be a portable, pocket-sized, handheld, computer built-in, or in-vehicle mobile apparatus, which exchanges voice and/or data with the radio access network.

In this embodiment of the present application, the base station is a network element for connecting a terminal and a core network, and the base station may be a base station (BS) in a UMTS, an evolved NodeB in a physical network communications system (Internet of Things Evolved NodeB, IoT eNB), a base transceiver station (BTS) in GSM or CDMA, a NodeB (NB) in WCDMA, or an evolved NodeB (eNB, or e-NodeB) in LTE. This is not limited in the present application. However, for ease of description, the following embodiments are described by using an evolved NodeB eNB and user equipment UE as an example.

In this embodiment of the present application, the core network may include a cellular Internet of Things serving gateway node (C-SGN), a mobility management entity (MME), a serving gateway (S-GW), a packet data network gateway (P-GW), and the like.

FIG. 2 is a schematic flowchart of a method according to an embodiment of the present application.

As shown in FIG. 2, the method is applied to a random access process, and the method is performed by user equipment, for example, may be performed by UE. The method includes the following steps:

Step 210: Receive indication information sent by a network device, where the indication information includes at least one piece of the following information: access probability information of each of a plurality of carriers, access control information of at least one of the plurality of carriers, overload indication information of at least one of the plurality of carriers, power boost information of at least one of the plurality of carriers, and access indication information of one of the plurality of carriers.

Step 220: Determine, based on the indication information, one carrier from the plurality of carriers as a target carrier to perform random access.

Specifically, the access probability information of the carrier indicates a probability that the UE can access the carrier. A base station may determine the access probability information of the carrier based on a resource size of the carrier, and the like. More resources of the carrier provide a greater access probability. The access control information of the carrier indicates performing access control on the UE. When the carrier performs access control on UE, the UE cannot access the carrier. The overload indication information of the carrier indicates whether the carrier is overloaded. To be specific, a resource of the carrier is occupied, and the UE is not expected to access the carrier. The power boost information of the carrier is used to indicate whether the carrier has a power boost. When the indication information is access indication information of a specific carrier, the user equipment accesses the specified carrier based on the access indication information.

Therefore, by receiving the indication information sent by the network side and determining, based on the indication information, the carrier for performing random access, the user equipment can determine the target carrier from the plurality of carriers to perform random access, thereby facilitating load balancing.

It should be understood that the indication information may be carried in dedicated signaling for configuration, or may be carried in broadcast signaling.

In an embodiment of the present application, the indication information is carried in the broadcast signaling, and the broadcast signaling includes one of the following: a master information block (MIB), a system information block (SIB) 1, a SIB 2, and a SIB 14.

In an embodiment of the present application, the indication information is carried in the dedicated signaling, and the dedicated signaling includes one of the following: an RRC connection reconfiguration message, an RRC connection setup message, an RRC connection release message, and a downlink direct transfer (DL information transfer) message.

In an embodiment of the present application, the indication information includes an access probability of at least one of the plurality of carriers, and the determining, based on the indication information, one carrier from the plurality of carriers as a target carrier to perform random access includes: generating a random number a, where a is a non-negative rational number; and determining, based on a correspondence between the random number a and a probability interval constituted of access probabilities of the plurality of carriers, the target carrier to perform random access.

To be specific, the access probabilities of the plurality of carriers are accumulated to constitute different probability intervals, and a value of the random number a generated by the user equipment is compared with the probability interval constituted of the access probabilities of the plurality of carriers. When the random number a falls within a probability interval of a carrier, the carrier is selected as the target carrier to perform random access.

In an embodiment of the present application, the indication information includes probability information of each of the plurality of carriers, a quantity of the plurality of carriers is n, an access probability of an $i^{th}$ carrier in then carriers is $P(i)$, $1 \le i \le n$, and a sum of the access probabilities of the n carriers is 1. Certainly, alternatively, access probabilities of n−1 carriers may be indicated in a broadcast, and an access probability of a remaining carrier is 1 minus a sum of probabilities of remaining carriers in the broadcast. A specific carrier that is not broadcast may be an anchor carrier, or may be a non-anchor carrier. The selecting, based on the indication information, one carrier from the plurality of carriers as a target carrier to perform random access includes:

generating the random number a, $0 \le a \le 1$; and when $a \le P(1)$, selecting a first carrier in the n carriers as the target carrier to perform random access;

when $a = P(1)$, selecting a first carrier or a second carrier in the n carriers as the target carrier to perform random access;

when $P(1)+ \ldots +P(j)<a<P(1)+ \ldots +P(j+1)$, selecting a $(j+1)^{th}$ carrier in the n carriers as the target carrier to perform random access; or when $P(1)+ \ldots +P(j)=a$, selecting a $j^{th}$ or a $(j+1)^{th}$ carrier in the n carriers as the target carrier to perform random access, where $1<j \le n$, and n is a positive integer.

Specifically, the UE generates a random number a, which is a random number evenly distributed between 0 and 1.

An access probability of each carrier sent by the network device is represented by using several bits. Specifically, the access probability of each carrier may be represented by using 3 to 4 bits, and ranges from 0 to 1, or may range from 0% to 95% like in an access control (for example, access class barring (ACB)) mechanism.

Because the quantity of the plurality of carriers is n, the access probability of the $i^{th}$ carrier in the n carriers is $P(i)$, and $1 \le i \le n$, the sum of the access probabilities of the n carriers is 1, in other words, it is ensured that the sum of the access probabilities of the carriers is 1. To be specific, practice of selecting a carrier for access is a complete event.

The access probability of each carrier is set to $P(i)$, where $i=1, 2, \ldots, n$, indicating a carrier serial number. Specifically, the following manner may be used: $P(1)+P(2)+ \ldots +P(n)=1$.

Specifically, sums obtained by separately accumulating the probabilities are compared with the random number a ($0 \le a \le 1$) generated by the UE. If $P(1)<a<P(1)+P(2)$, the UE selects a carrier 2 corresponding to $P(2)$. If $P(1)+P(2)<a<P(1)+P(2)+P(3)$, the UE selects a carrier 3 corresponding to $P(3)$. In this manner, specifically, the probabilities may be accumulated in a specified default sequence or a sequence in which the base station configures the probabilities of the carriers, and a carrier is selected.

For example, the base station indicates, in the broadcast, that an access probability of an anchor carrier anchor carrier numbered by 1 is 0.1, an access probability of a non-anchor carrier non-anchor carrier numbered by 2 is 0.2, an access probability of a non-anchor carrier numbered by 3 is 0.3, and an access probability of a non-anchor carrier numbered by 4 is 0.4.

If the random number generated by the UE is 0.5, $0.1+0.2<0.5<0.1+0.2+0.3$ according to the foregoing formula, and the non-anchor carrier numbered by 3 should be selected. If the generated random number is 0.8, $0.1+0.2+0.3<0.8<0.1+0.2+0.3+0.4$, and the non-anchor carrier numbered by 4 should be selected.

If the access probabilities of the carriers are the same, a selected carrier has a relatively great relationship with a sequence. Likewise, a carrier may be selected in a specified sequence or a configuration sequence, namely, a sequence of configuring each carrier in the broadcast of the base station.

For example, if there are four carriers: an anchor carrier numbered by 1, a non-anchor carrier numbered by 2, a non-anchor carrier numbered by 3, and a non-anchor carrier numbered by 4, access probabilities of the four carriers are indicated in a system broadcast, and an access probability of each carrier is 0.25. If the random number generated by the UE is 0.6, the non-anchor carrier numbered by 3 non-anchor carrier 3 should be selected according to the foregoing rule.

For an endpoint value, the random number generated by the UE is an endpoint value of a sum of carrier probabilities, such as 0.25, 0.5, and 0.75 in this example. Based on the configuration sequence, when a carrier is selected, a carrier corresponding to a probability before an endpoint may be selected, or a carrier corresponding to a probability range after the endpoint value may be selected. The selection may be specifically made according to a rule or a default configuration.

In an embodiment of the present application, the selecting, based on the indication information, at least one carrier from the plurality of carriers as a target carrier to perform random access includes: regenerating a random number a when the $j^{th}$ carrier is a carrier with access control; and selecting, based on the regenerated random number a, one carrier from the plurality of carriers as the target carrier to perform random access.

To be specific, when the carrier selected by the UE based on the probability performs access control on the UE, in other words, when the UE is prohibited from accessing the carrier, the UE may regenerate the random number according to the foregoing method, and reselect an access carrier until the UE selects a carrier that does not perform access control on the UE.

It should be understood that, if access control on the UE is performed by an anchor carrier, and all non-anchor carriers do not perform access control on the UE, the UE reselects a carrier, and can perform random access provided that the UE finds the non-anchor carrier. If the non-anchor carrier also performs access control, has another overload indication, or the like, the UE may also reselect a carrier according to the foregoing method. This is not limited in the present application.

In an embodiment of the present application, there is an anchor carrier with access control in the plurality of carriers, the indication information includes the probability information of each of the plurality of carriers, an access probability of the anchor carrier with access control is $P_0$, a quantity of carriers other than the anchor carrier with access control in the plurality of carriers is m, a sum of access probabilities of the m carriers is $1-P_0$, $0 \leq a \leq 1-P_0$, and the determining, based on a correspondence between the random number a and a probability interval constituted of access probabilities of the plurality of carriers, the target carrier to perform random access includes:

when $a \leq P(1)$, selecting a first carrier in the m carriers as the target carrier to perform random access;

when $a=P(1)$, selecting a first carrier or a second carrier in the m carriers as the target carrier to perform random access;

when $P(1)+\ldots+P(j)<a<P(1)+\ldots+P(j+1)$, selecting a $(j+1)^{th}$ carrier in the m carriers as the target carrier to perform random access; or when $P(1)+\ldots+P(j)=a$, selecting a $j^{th}$ or a $(j+1)^{th}$ carrier in the m carriers as the target carrier to perform random access, where $1 \leq j \leq m$.

To be specific, a range of the random number generated by the UE is $1-P_0$, and $1-P_0$ is a sum of access probabilities of carriers other than the carrier with access control. Therefore, based on the random number generated by the UE, according to the foregoing method, a carrier without access control may be selected to perform random access.

In an embodiment of the present application, at least one carrier with access control is an anchor carrier, the indication information includes the probability information of each of the plurality of carriers, an access probability of the anchor carrier with access control is $P_0$, a quantity of carriers other than the anchor carrier with access control in the plurality of carriers is p, and a sum of access probabilities of the p carriers is $1-P_0$.

To be specific, if $P_0$ is the access probability of the anchor carrier anchor carrier, based on the random number generated by the UE, according to the foregoing method, a non-anchor carrier non-anchor carrier other than the anchor carrier may be selected to perform random access.

In an embodiment of the present application, there is the at least one carrier with access control in the plurality of carriers, the indication information includes probability information of each carrier without access control in the plurality of carriers, a quantity of carriers without access control in the plurality of carriers is p, a sum of access probabilities of the p carriers is 1, and the selecting, based on the indication information, at least one carrier from the plurality of carriers as a target carrier to perform random access includes:

generating the random number a, $0 \leq a \leq 1$; and when $a \leq P(1)$, selecting a first carrier in the p carriers as the target carrier to perform random access;

when $a=P(1)$, selecting a first carrier or a second carrier in the p carriers as the target carrier to perform random access;

when $P(1)+\ldots+P(j)<a<P(1)+\ldots+P(j+1)$, selecting a $j^{th}$ carrier in the p carriers as the target carrier to perform random access; or when $P(1)+\ldots+P(j)=a$, selecting a $j^{th}$ or a $(j+1)^{th}$ carrier in the p carriers as the target carrier to perform random access, where $1 \leq j \leq p$, and p is a positive integer.

To be specific, if a base station side determines that one or more carriers perform access control on the UE, a sum of access probabilities of other carriers that do not perform access control is 1, and the UE selects, as the target carrier to perform random access, one carrier only from the carriers that do not perform access control.

In an embodiment of the present application, the at least one carrier with access control is an anchor carrier, the indication information includes probability information of each non-anchor carrier in the plurality of carriers, a quantity of non-anchor carriers without access control in the plurality of carriers is q, and a sum of access probabilities of the q non-anchor carriers is 1, where q is a positive integer.

To be specific, only the anchor carrier in the foregoing carriers performs access control on the UE, and the UE selects, as the target carrier to perform random access, one carrier from the non-anchor carriers that do not perform access control.

Therefore, the UE selects, by using the access probability of each carrier, the target carrier to perform random access, thereby balancing load.

In an embodiment of the present application, when the base station is aware, in a connected mode, that the UE is out of synchronization in an uplink, or in another scenario, the base station may perform indication by using dedicated signaling or a PDCCH, to indicate, to the UE, a carrier for performing random access. When the PDCCH is used for indication, a PDCCH order manner is used for indication. Specifically, indication may be performed in downlink control information (DCI). For example, 1 bit is used to indicate whether random access is performed on a current carrier, or 1 bit is used to indicate whether random access is performed on an anchor carrier, or several bits are used to indicate an index value of a carrier, to be specific, indicate that the target carrier is used by a terminal to perform random access. In the dedicated signaling, a similar manner may also be used: 1 bit indicates whether random access is performed on a current carrier, or 1 bit indicates whether random access is performed on an anchor carrier, or several bits are used to indicate an index value of a carrier, or the like.

In an embodiment of the present application, when a carrier for random access is selected from the plurality of carriers, calculation may be performed based on a UE ID. For example, a quantity of carriers is m, and an index value of the selected carrier is L=UE ID mod m, or the index value of the used carrier is indicated in a similar manner. However, when the selected carrier performs access control on the UE or has information such as an overload indication, the UE may make a selection from other carriers by using a selection method such as a method in another embodiment of the present application or through a random selection.

In an embodiment of the present application, if the UE selects one carrier to perform random access, but after sending a preamble fails at least once or access still fails after a quantity of attempts to access the carrier reaches a maximum quantity, the UE may select the current carrier to perform random access again, or select an anchor carrier, or use the method in this embodiment.

In an embodiment of the present application, the UE generates a random number a, where a value range of a is from 0 to 1; and the network side indicates a probability value by using a system broadcast or dedicated signaling, where the probability value also ranges from 0 to 1, or from 0% to 95%. An anchor carrier is selected if a is less than the probability value in the broadcast. A non-anchor carrier is selected if a is not less than the probability value in the broadcast. Alternatively, an opposite manner is used. Endpoint value processing is similar to processing in the foregoing embodiment. If a selection is made from the non-anchor carriers, another method may be used, for example, a method in another embodiment of the present application.

In an embodiment of the present application, the selecting, based on the indication information, at least one carrier from the plurality of carriers as a target carrier to perform random access includes: when an anchor carrier in the plurality of carriers does not perform access control, selecting the anchor carrier as the target carrier to perform random access.

To be specific, when the anchor carrier does not perform access control, the anchor carrier has a higher priority than another non-anchor carrier. Therefore, the UE preferentially chooses to access the anchor carrier.

In an embodiment of the present application, the indication information includes access control information of s carriers in the plurality of carriers, the s carriers include an anchor carrier, and the selecting, based on the indication information, one carrier from the plurality of carriers as a target carrier to perform random access includes: selecting one carrier from carriers other than the s carriers in the plurality of carriers as the target carrier to perform random access, where s is a positive integer.

To be specific, when one or more carriers perform access control on the UE, the UE selects, as the target carrier to perform random access, one carrier from carriers that do not perform access control.

It should be understood that, the target carrier may be randomly selected from the carriers that do not perform access control; or according to the method in the foregoing embodiment, the target carrier may be selected based on probability information of the carriers that do not perform access control or based on the UE ID, to perform random access. This is not limited in the present application.

In an embodiment of the present application, the s carriers with access control include s−1 non-anchor carriers, and access control information of the non-anchor carriers indicates, by using a bitmap, performing access control.

Specifically, in addition to a configuration method in which the anchor carrier performs access control on the UE, the non-anchor carrier uses simplified access control to enable the UE to select, in a balanced manner, the carrier for random access.

For example, for the anchor carrier, an original access control AB method keeps unchanged, and for remaining carriers (non-anchor carriers), access control is not performed for related information such as a public land mobile network (PLMN). In a simplified manner, the base station performs access control only on UE of categories AC 0 to 9. To be specific, there is one bitmap configuration for each non-anchor carrier. To reduce signaling overheads, certainly, a plurality of non-anchor carriers may alternatively use one bitmap for control. A specific indication parameter may be in the MIB, the SIB 1, the SIB 14, or another SIB, or may be in the dedicated signaling. If the specific indication parameter is in the SIB 14, a specific bit change does not cause a change in a value tag of a system message.

In an embodiment of the present application, each non-anchor carrier has one set of AB access control parameters. The base station may control other non-anchor carriers in a balanced manner (how to balance the non-anchor carrier) based on a UE category controlled by the anchor carrier (how the anchor controls the UE category). Alternatively, in comparison with original AB control parameters, for the other non-anchor carriers, the UE category, an exception report, and special AC control are reduced, and only AC 0 to 9 control related to the PLMN is considered. A configuration of the anchor carrier may also be used for a configuration related to the PLMN. A specific manner is not limited.

It should be understood that a plurality of non-anchor carriers may alternatively use one set of AB control parameters.

In an embodiment of the present application, the indication information includes access control information of an anchor carrier in the plurality of carriers, and the selecting, based on the indication information, one carrier from the plurality of carriers as a target carrier to perform random access includes: when the anchor carrier in the plurality of carriers performs access control, selecting the target carrier from non-anchor carriers other than the anchor carrier in the plurality of carriers to perform random access.

To be specific, if the received indication information indicates that the anchor carrier performs access control, and the other non-anchor carriers do not perform access control on the UE, in other words, when the UE is prohibited from accessing the anchor carrier, and the other non-anchor carriers have no limitation on the UE, the UE selects one carrier from the non-anchor carriers to perform random access.

It should be understood that, if the indication information further includes access control information of the non-anchor carrier, one carrier is selected from non-anchor carriers to which access control is not indicated, to perform random access.

It should be further understood that, the target carrier may be randomly selected from the non-anchor carriers that do not perform access control; or according to the method in the foregoing embodiment, the target carrier may be selected based on probability information of the non-anchor carriers that do not perform access control, to perform random access. This is not limited in the present application.

In an embodiment of the present application, the indication information includes access control information of an anchor carrier in the plurality of carriers and overload indication information of r non-anchor carriers in the plurality of carriers, and the selecting, based on the indication information, one carrier from the plurality of carriers as a target carrier to perform random access includes: selecting one carrier from carriers other than the anchor carrier and the r non-anchor carriers in the plurality of carriers as the target carrier to perform random access, where r is a positive integer.

To be specific, when the anchor carrier performs access control and there is an overload indication of at least one non-anchor carrier, one carrier is selected, as the target carrier to perform random access, from non-anchor carriers that have no overload indication.

In an embodiment of the present application, the indication information includes access control information of an anchor carrier in the plurality of carriers and overload indication information of each non-anchor carrier in the plurality of carriers, and the selecting, based on the indication information, one carrier from the plurality of carriers as a target carrier to perform random access includes: selecting one carrier from the non-anchor carriers in the plurality of carriers as the target carrier to perform random access.

To be specific, when the anchor carrier performs access control on the UE, and all the non-anchor carriers indicate overload to the UE, the UE selects one carrier from the plurality of carriers with overload indications to perform random access.

In an embodiment of the present application, when for the UE, there is at least one carrier that does not perform access control and does not have an overload indication, the UE may preferentially select the anchor carrier or a carrier with a power boost.

Therefore, the UE selects, by receiving the overload indication information that is of the carrier and that is sent by the base station, the target carrier to perform random access, thereby balancing load.

In an embodiment of the present application, the indication information includes power boost indication information of t carriers in the plurality of carriers, and the selecting, based on the indication information, one carrier from the plurality of carriers as a target carrier to perform random access includes: selecting one carrier from the t carriers as the target carrier to perform random access, where t is a positive integer.

In an embodiment of the present application, the user equipment is low power class user equipment, and selects the target carrier from the plurality of carriers based on the power boost indication information of the t carriers in the plurality of carriers.

An existing UE power class is usually 20 dBm and 23 dBm. After UE in a power class 14 dBm (which is briefly referred to as low power class UE for short) is added, when the low power class UE is in a coverage enhancement case (or in a deep coverage case), the base station needs to repeatedly send data to the low power class UE more times than to other high power class UE at a same location, so that the low power class UE can receive the data sent by the base station. To be specific, compared with other normal UE, when a coverage level is selected, the UE selects a higher coverage level at a same location. In addition, the base station can have different configurations on different carriers. When a power boost is configured for a carrier, and the low power class UE accesses the carrier (for example, a 6 dB carrier) with the power boost, the base station needs fewer repetition times at a same coverage level, so that the low power class UE can receive the data sent by the base station. In this way, compared with a carrier without a power boost, the UE can receive the data without listening many times, helping reduce UE power consumption. Certainly, access of other normal UE is not limited in the present application.

To be specific, when the system message or the dedicated signaling indicates whether each carrier has a power boost, the low power class UE selects a carrier supporting the power boost. If a plurality of carriers support the power boost, the UE may randomly make a selection or make a selection according to the foregoing implementation.

It should be understood that carrier selection methods in the foregoing embodiment may be combined for use, and this is not limited in the present application.

Figure 4:
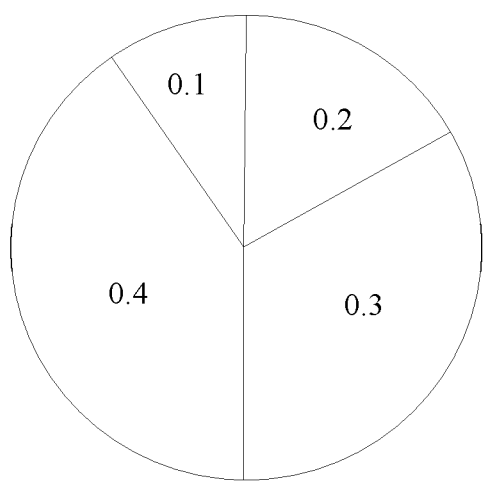
FIG. 4 is a probability diagram according to an embodiment of the present application.

FIG. 3 is a schematic diagram of a method according to an embodiment of the present application. As shown in FIG. 3, an access probability of an anchor carrier numbered by 1 is 0.1, an access probability of a non-anchor carrier numbered by 2 is 0.2, an access probability of a non-anchor carrier numbered by 3 is 0.3, and an access probability of a non-anchor carrier numbered by 4 is 0.4. In other words, P(1)=0.1, P(2)=0.2, P(3)=0.3, P(4)=0.4, and P(1)+P(2)+P(3)+P(4)=1. Probability distribution of the four carriers may be represented in FIG. 4, and the probabilities of the four carriers constitute a complete event.

User equipment generates a random number a, where a is a non-negative rational number. The user equipment determines, based on a correspondence between the random number a and a probability interval constituted of access probabilities of a plurality of carriers, the target carrier to perform random access. For example, when the random number of the user equipment is a=0.2, P(1)<0.2<P(1)+P(2) according to a formula in the foregoing embodiment, and the random number a exactly falls within a probability interval of the non-anchor carrier numbered by 2. Therefore, the non-anchor carrier numbered by 2 is selected as the target carrier to perform random access. For another example, when the random number of the user equipment is a=0.7, P(1)+P(2)+P(3)<0.7<P(1)+P(2)+P(3)+P(4), and the random number a exactly falls within a probability interval of the non-anchor carrier numbered by 4. Therefore, the non-anchor carrier numbered by 4 is selected as the target carrier to perform random access.

FIG. 5 is a schematic diagram of a method according to another embodiment of the present application. As shown in FIG. 5, there are four carriers: an anchor carrier numbered by 1, a non-anchor carrier numbered by 2, a non-anchor carrier numbered by 3, and a non-anchor carrier numbered by 4, access probabilities of the four carriers are indicated in a system broadcast, and an access probability of each carrier is 0.25. If a random number generated by UE is 0.6, the non-anchor carrier numbered by 3 non-anchor carrier 3 should be selected according to the foregoing rule.

For an endpoint value, the random number generated by the UE is an endpoint value of a sum of carrier probabilities, such as 0.25, 0.5, and 0.75 in this example. Based on a configuration sequence, when a carrier is selected, a carrier corresponding to a probability before an endpoint may be selected, or a carrier corresponding to a probability range after the endpoint value may be selected. The selection may be specifically made according to a rule or a default configuration.

FIG. 6 is a schematic flowchart of a method according to another embodiment of the present application. The method may be performed by a base station. As shown in FIG. 6, the method includes the following steps:

Step 610: Determine indication information of at least one of a plurality of carriers, where the indication information includes at least one piece of the following information: access probability information of the carrier, access control information of the carrier, overload indication information of the carrier, power boost information of the carrier, and access indication information of the carrier.

Step 620: Send the indication information of the at least one carrier.

Specifically, the access probability information of the carrier indicates a probability that UE can access the carrier. The base station may determine the access probability information of the carrier based on a resource size of the carrier, and the like. More resources of the carrier provide a greater access probability. The access control information of the carrier indicates performing access control on the UE. When the carrier performs access control on UE, the UE cannot access the carrier. The overload indication information of the carrier indicates whether the carrier is overloaded. To be specific, a resource of the carrier is occupied, and the UE is not expected to access the carrier. The power boost information of the carrier is used to indicate whether the carrier has a power boost. The access indication information of the carrier is used to indicate that the user equipment accesses, based on the indication information, a carrier corresponding to this indication, and uses the carrier as a target carrier to perform random access.

Therefore, by receiving the indication information sent by a network side and selecting, based on the indication information, the carrier for performing random access, the user equipment UE can select one target carrier from the plurality of carriers to perform random access, thereby facilitating load balancing.

It should be understood that the indication information may be carried in broadcast signaling for delivery, or may be carried in dedicated signaling for delivery.

In an embodiment of the present application, the indication information is carried in the broadcast signaling, and the broadcast signaling includes one of the following: a MIB, a SIB 1, and a SIB 14.

In an embodiment of the present application, the indication information is carried in the dedicated signaling, and the dedicated signaling includes one of the following: an RRC connection reconfiguration message, an RRC connection setup message, an RRC connection release message, and a downlink direct transfer message.

In an embodiment of the present application, a sum of access probabilities of the plurality of carriers is 1.

In an embodiment of the present application, a sum of probabilities of carriers other than a carrier with access control in the plurality of carriers is 1.

In an embodiment of the present application, a carrier with access control in the plurality of carriers is an anchor carrier.

In an embodiment of the present application, a non-anchor carrier in the plurality of carriers performs access control by using a bitmap indication.

Specifically, in addition to a configuration method in which the anchor carrier performs access control on the UE, the non-anchor carrier uses simplified access control to enable the UE to select, in a balanced manner, the carrier for random access.

For example, for the anchor carrier, an original access control (AB) method keeps unchanged, and for remaining carriers non-anchor carriers, access control is not performed for related information such as a PLMN. In a simplified manner, the base station performs access control only on UE of categories AC 0 to 9. To be specific, there is one bitmap configuration for each non-anchor carrier. To reduce signaling overheads, certainly, a plurality of non-anchor carriers may alternatively use one bitmap for control. A specific indication parameter may be in the MIB, the SIB 1, the SIB 14, or another SIB, or may be in the dedicated signaling. If the specific indication parameter is in the SIB 14, a specific bit change does not cause a change in a value tag of a system message.

In an embodiment of the present application, each non-anchor carrier has one set of AB access control parameters. The base station may control another non-anchor carrier in a balanced manner (how to balance the non-anchor carrier) based on a UE category controlled by the anchor (how the anchor controls the UE category). Alternatively, in comparison with original AB control parameters, for the another non-anchor carrier, the UE category, an exception report, and special AC control are reduced, and only AC 0 to 9 control related to the PLMN is considered. A configuration of the anchor carrier may also be used for a configuration related to the PLMN. A specific manner is not limited.

It should be understood that a plurality of non-anchor carriers may alternatively use one set of AB control parameters.

Therefore, the non-anchor carrier performs access control on the UE in a simplified manner, so that signaling overheads can be reduced.

Figure 7:
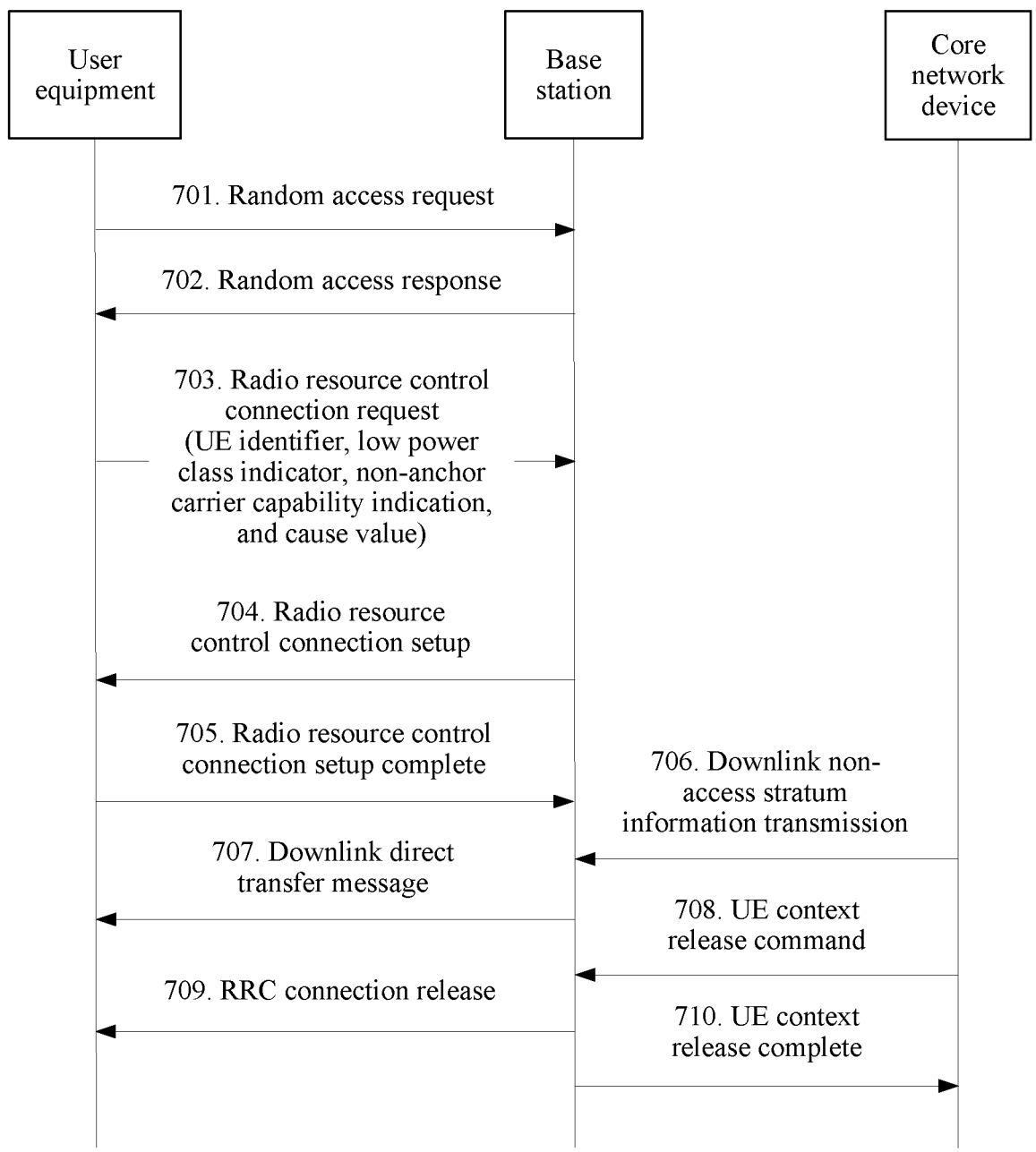
FIG. 7 is a schematic flowchart of a method according to an embodiment of the present application.

FIG. 7 is a schematic flowchart of a method according to an embodiment of the present application.

The method includes the following steps.

Step 1: A network device receives capability indication information sent by UE, and sends the capability indication information of the UE to a core network device. It should be understood that the core network device may be an MME, an S-GW, a P-GW, or the like, and this is not limited in the present application.

Step 2: An MME stores the capability indication information of the UE.

Step 3: The MME sends the capability indication information of the UE to the network device, where the indication information is carried in any one of the following messages:

an initial context setup request and a paging message.

It should be understood that the capability indication information of the UE may also be carried in another message, and this is not limited in the present application.

Specifically, the capability indication information of the UE may be carried by using a field of the paging message, for example, may alternatively be included in a UE radio capability for paging field, or may be included in an assistance information for paging (Assistance Data for paging) field; and may be further sent to a base station together with a coverage level by using assistance data for coverage enhancement (CE) capable UEs in assistance data for paging. A specific manner is not limited.

Step 4: The network device determines a scheduling resource of the UE based on the capability indication information of the UE.

It should be understood that the capability indication information includes power class information, and the power class information may be a low power class indicator.

An embodiment is shown in FIG. 7, and FIG. 7 shows a procedure for interaction between user equipment, a base station, and a core network device.

Step 701: UE sends a random access request to a base station.

Step 702: The base station sends a random access response (for example RRC connection request) to the UE.

Step 703: The UE sends a radio resource control connection request to the base station, where the radio resource control connection request carries a UE identifier, a low power class indicator, non-anchor carrier capability indication information, and a cause value.

Step 704: The base station sends a radio resource control connection setup acknowledgement message to the UE.

Step 705: The UE sends a radio resource control connection setup complete acknowledgement to the base station.

Step 706: A core network device transmits non-access stratum information to the base station.

Step 707: The base station sends a downlink direct transfer message to the UE.

Step 708: The core network device sends a UE context release command to the base station.

Step 709: The base station sends an RRC connection release message to the user equipment.

Step 710: The base station sends a UE context release complete command to the core network device.

For relatively low power class UE, compared with other UE, required coverage enhancement is different when a same signal level or same signal quality (such as an RSRP or RSRQ result) is measured. In an uplink, more repetitions may be required, and a higher coverage level may be selected. However, in a downlink, a large quantity of repetitions may not be required. In this case, the base station needs to obtain information that the UE is in a low power class, so that signaling overheads may be reduced and resources may be saved.

For example, the UE may add an RRC connection request to a message 3 or an RRC connection setup request. In this way, when the base station schedules a message 4 and a subsequent message, a relatively small quantity of repetitions may be used.

Therefore, the low power class UE may also be reported as capability information, for example, be sent to the base station by using UE capability information. The base station may send the capability information to a core network, and a message that may carry the UE capability information specifically includes one of the following:

an uplink S1-AP (S1 Application Protocol) message such as an initial UE message, an uplink Non-Access Stratum (NAS) transport message, a UE context release complete-message, a UE context suspend request, and a UE capability information indication (for example capability Info Indication).

The core network device learns of the UE capability information by using the foregoing information. For example, after learning of the information that the UE is in the low power class, the core network device may store the UE capability information, so that the core network device sends the UE capability information to the base station when the base station initiates paging to the UE. After receiving the message, the base station may further consider this factor during paging scheduling, to reduce scheduling of PDCCH repetitions. In addition, if the UE is paged, there is no need to report the capability indication after a connection is set up.

The UE capability information stored by the core network device includes low power class indication information, and the indication information may be expressed in English as a low power class indicator or low power class support, or may be further expressed as other indication information such as "support" or "not support" in an enumeration form. It should be understood that any indication information that can indicate that the UE is in the low power class falls within the scope of the present application.

Therefore, the network device can determine the UE capability information based on the capability indication information of the UE, and further determine scheduling for the UE.

Figure 8:
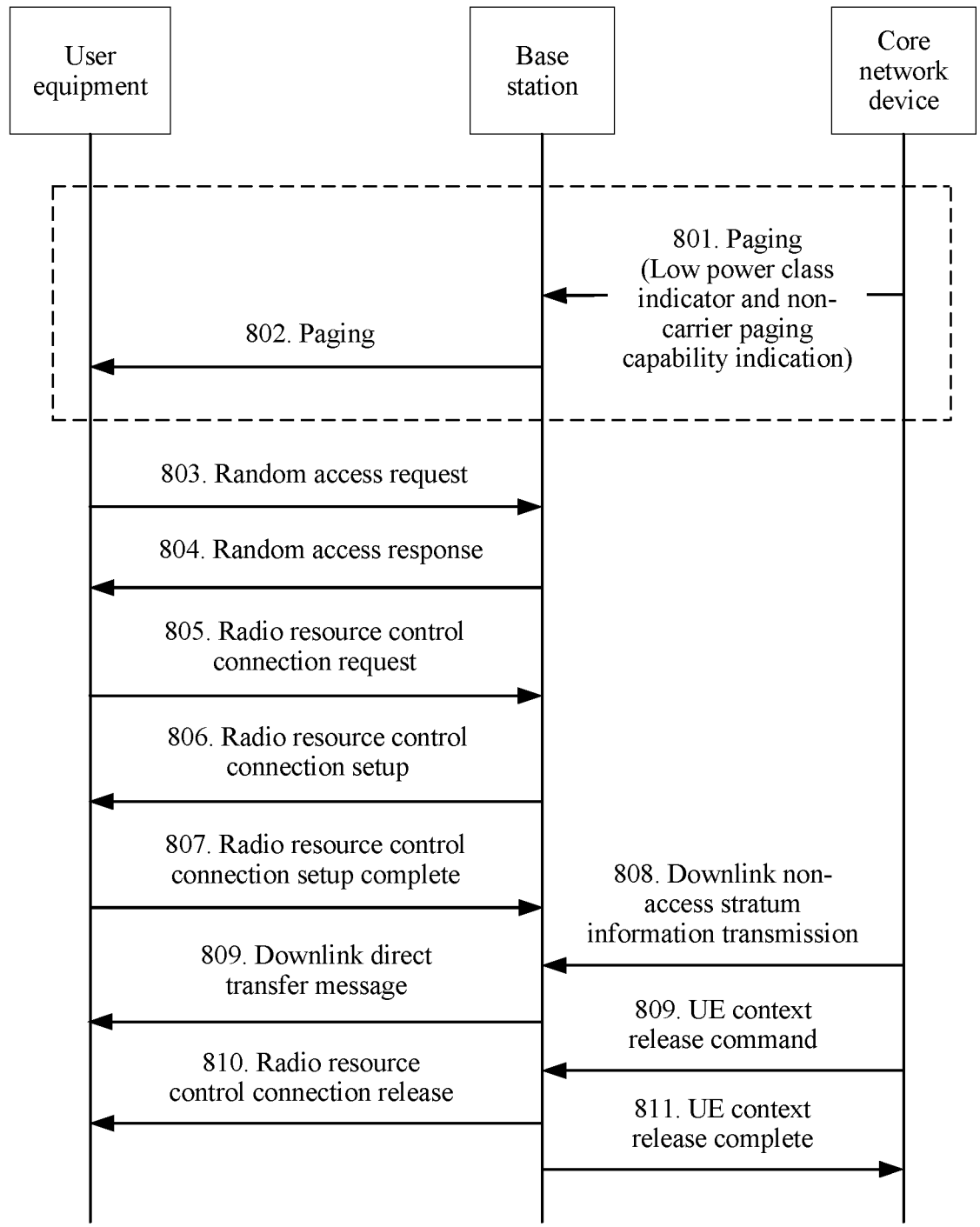
FIG. 8 is a schematic flowchart of a method according to an embodiment of the present application.

FIG. 8 is a schematic flowchart of a method according to an embodiment of the present application.

Step 1: A base station receives indication information, sent by UE, of supporting non-anchor carrier paging. The indication information of supporting non-anchor carrier paging is carried in one of the following messages:

The indication information is carried in a message such as an RRC connection request message, an RRC connection setup complete message, and an uplink direct transfer message, and an uplink air interface message such as UE capability information.

Step 2: The base station receives the indication information, sent by the UE, of supporting non-anchor carrier paging, and sends, to a core network device, the indication information that is of supporting non-anchor carrier paging and that is of the UE, where the indication information of supporting non-anchor carrier paging is carried in one of the following messages:

an uplink S1-AP message such as an initial UE message, an uplink NAS transport (UL NAS Transport) message, a UE context release complete message, a UE context suspend request, and a UE capability information indication (capability Info Indication).

Step 3: The core network device stores capability indication information of the UE.

Step 4: The core network device sends, to the base station, the indication information that is of supporting multi-carrier paging and that is of the UE, where the indication information is carried in any one of the following messages:

a message such as an initial context setup request and a paging message.

Specifically, in the paging message, the indication information may be used as a field of the paging message, or may be included in a UE radio capability for paging field, or may be included in an assistance data for paging (assistance information for paging) field, and may be further sent to the base station together with a coverage level by using assistance data for CE capable UEs in assistance data for paging, or the like. A manner is not limited.

Step 5: The network device determines, based on the capability indication information of the UE, that the UE supports multi-carrier access.

As shown in FIG. 8, FIG. 8 shows a procedure for interaction between user equipment, a base station, and a core network device.

Step 801: A core network device sends a paging message to a base station.

Step 802: The base station initiates a paging message to user equipment.

Step 803: The user equipment sends a random access request to the base station.

Step 804: The base station sends a random access response to the user equipment.

Step 805: The user equipment sends a radio resource control connection request to the base station.

Step 806: The base station returns a radio resource control setup message to the user equipment.

Step 807: The user equipment sends a radio resource control connection complete message to the base station.

Step 808: The core network device sends downlink non-access stratum information to the base station.

Step 809: The base station sends a UE context release command to the user equipment.

Step 810: The base station sends a radio resource control connection release message to the user equipment.

Step 811: The base station sends a UE context release complete command to the core network device.

The core network device sends the paging message to the base station, where the paging message carries a new power class indicator, used to indicate that the UE is in a low power class (for example, the UE is with 14 dBm), so that the base station may store power class indication information of the UE after receiving the paging message. The paging message sent by the core network device to the base station includes an S-TMSI (System Architecture Evolved (SAE)-Temporary Mobile Subscriber Identity). Therefore, the base station may learn that the indication information specifically belongs to which UE. The indication information may be in a field of the paging message, or may be included in a UE radio capability for paging field, to be specific, the indication information is included in UE radio paging information defined in T336.331, or may be included in an assistance information for paging (Assistance for paging) field as assistance indication information, and be sent to the base station together with a coverage level or other assistance information. After receiving the message, the base station may further select a proper quantity of PDCCH repetitions based on coverage level information and a low power class indicator, thereby reducing resource waste. In this case, when initiating a connection, the UE does not need to indicate the capability information in a message 3 or another message, and the base station may learn of the capability information and perform related scheduling. For low power class UE, considering a DL power consumption problem, the paging message may alternatively be received only on an anchor carrier.

When configuring a physical random access channel (PRACH) resource, the base station also needs to consider another factor such as a resource configuration of another base station or a cell, to avoid interference caused when a terminal performs random access. Resource transfer between base stations can effectively resolve this problem. An X2-AP (X2 Application Protocol) message of an X2 interface may be used for transfer between the base stations, or a PRACH configuration (physical random access channel configuration) may be carried in serving cell information of X2 interface setup and update messages for transfer. Transfer content includes a specific random access resource configuration. When a plurality of carriers are used for random access, the transfer content includes a random access resource configuration of each carrier. The configuration may specifically include related uplink and downlink repetition quantity configurations related to the coverage level, such as a time and/or frequency configuration, an offset setting, and a quantity of repetitions of sending a preamble, and may also include a quantity of repetitions of a corresponding PDCCH for scheduling a downlink random access response, an offset setting of a downlink PDCCH resource, time-frequency resource information, and the like. The configuration is specifically embodied as PRACH information of other non-anchor carriers than the anchor carrier. An NB-IoT physical random access channel (NPRACH) resource list of a non-anchor carrier corresponding to this cell is exchanged. Certainly, resource information of the anchor carrier and resource information of the non-anchor carrier may alternatively be sent by using one field in a list form.

The foregoing describes in detail a network slice management method and a network management architecture according to embodiments of the present application with reference to FIG. 1 to FIG. 8. The following describes in detail network devices according to embodiments of the present application with reference to FIG. 9 to FIG. 12.

Figure 9:
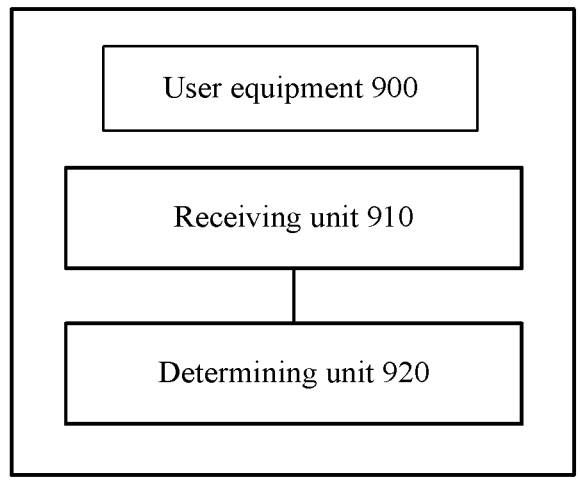
FIG. 9 is a structural block diagram of user equipment according to an embodiment of the present application.

FIG. 9 is a schematic block diagram of a user equipment 900 according to an embodiment of the present application. It should be understood that the user equipment 900 can perform the steps performed by the user equipment in the methods in FIG. 1 to FIG. 8. To avoid repetition, details are not described herein again. The user equipment 900 includes:

a receiving unit 910, configured to receive indication information sent by a network device, where the indication information includes at least one piece of the following information: access probability information of each of a plurality of carriers, access control information of at least one of the plurality of carriers, overload indication information of at least one of the plurality of carriers, power boost information of at least one of the plurality of carriers, and access indication information of one of the plurality of carriers; and a determining unit 920, configured to determine, based on the indication information, one carrier from the plurality of carriers as a target carrier to perform random access.

Therefore, by receiving the indication information sent by the network side and determining, based on the indication information, the carrier for performing random access, the user equipment can determine the target carrier from the plurality of carriers to perform random access, thereby facilitating load balancing.

Figure 10:
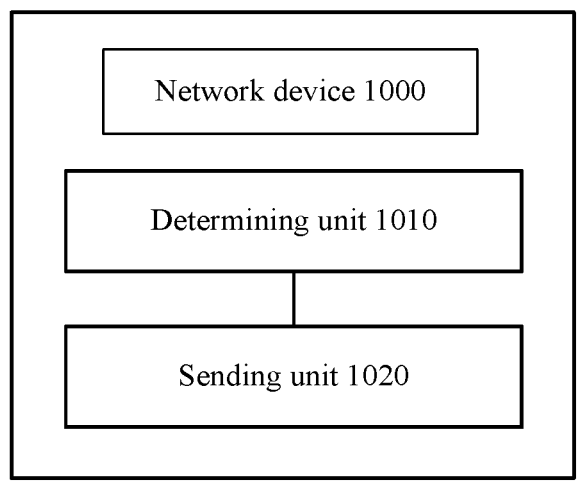
FIG. 10 is a structural block diagram of a network device according to another embodiment of the present application.

FIG. 10 is a structural block diagram of a network device according to another embodiment of the present application. FIG. 10 is a schematic block diagram of a network device 1000 according to an embodiment of the present application. It should be understood that the network device 1000 can perform the steps performed by the network device in the methods in FIG. 1 to FIG. 8. To avoid repetition, details are not described herein again. The network device 1000 includes:

a determining unit 1010, configured to determine indication information of at least one of a plurality of carriers, where the indication information includes at least one piece of the following information: access probability information of the carrier, access control information of the carrier, overload indication information of the carrier, power boost information of the carrier, and access indication information of the carrier; and a sending unit 1020, configured to send the indication information of the at least one carrier.

Therefore, by receiving the indication information sent by the network side and determining, based on the indication information, a carrier for performing random access, user equipment can determine a target carrier from the plurality of carriers to perform random access, thereby facilitating load balancing.

Figure 11:
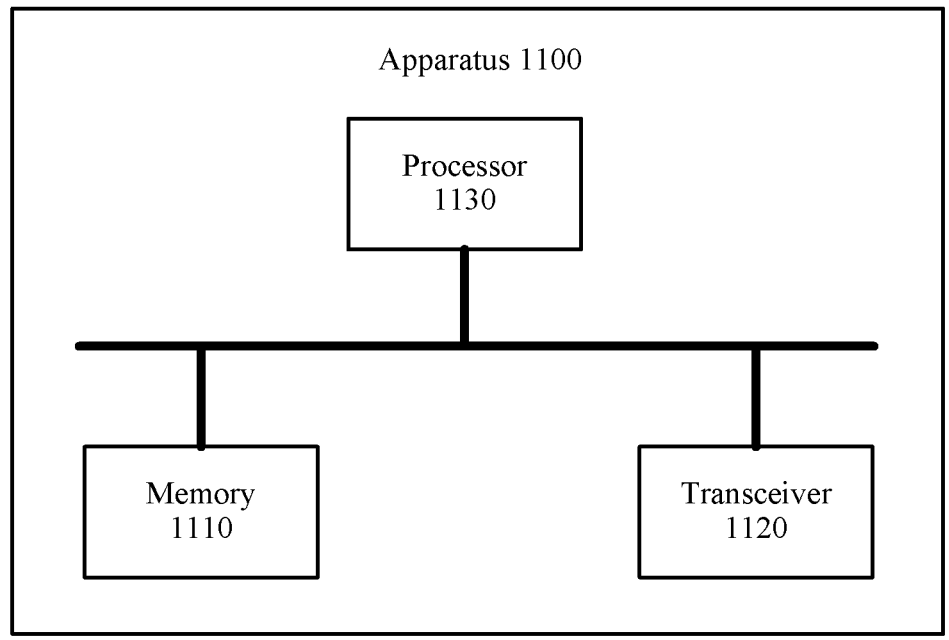
FIG. 11 is a schematic structural diagram of an apparatus according to an embodiment of the present application.

FIG. 11 is a schematic structural diagram of an apparatus according to an embodiment of the present application. FIG. 11 shows an apparatus 1100 provided in this embodiment of the present application. It should be understood that the apparatus 1100 can perform the steps performed by the user equipment in the methods in FIG. 1 to FIG. 8. To avoid repetition, details are not described herein again. The apparatus 1100 includes:

a memory 1110, configured to store a program;

a transceiver 1120, configured to communicate with another device; and a processor 1130, configured to execute the program in the memory 1110, where when the program is executed, the processor 1130 is configured to receive, by using the transceiver 1120, indication information sent by a network device, where the indication information includes at least one piece of the following information: access probability information of each of a plurality of carriers, access control information of at least one of the plurality of carriers, overload indication information of at least one of the plurality of carriers, power boost information of at least one of the plurality of carriers, and access indication information of one of the plurality of carriers; and the processor 1130 is further configured to determine, based on the indication information, one carrier from the plurality of carriers as a target carrier to perform random access.

It should be understood that the apparatus 1100 may be specifically the user equipment in the foregoing embodiments, and may be configured to perform the steps and/or procedures corresponding to the user equipment in the foregoing method embodiments.

Therefore, by receiving the indication information sent by the network side and determining, based on the indication information, the carrier for performing random access, the user equipment can determine the target carrier from the plurality of carriers to perform random access, thereby facilitating load balancing.

Figure 12:
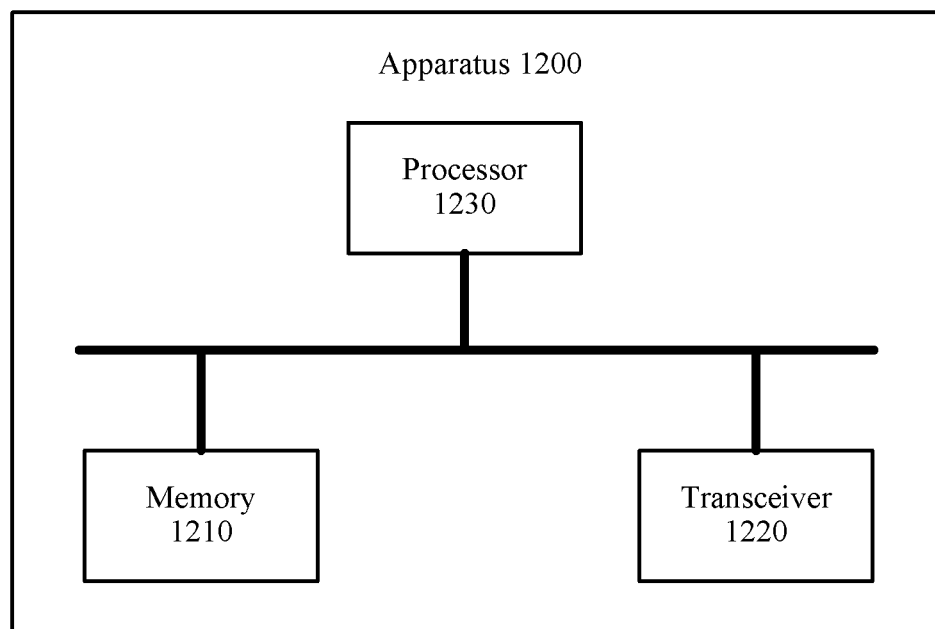
FIG. 12 is a schematic structural diagram of an apparatus according to another embodiment of the present application.

FIG. 12 is a schematic structural diagram of an apparatus according to another embodiment of the present application. It should be understood that the apparatus 1200 can perform the steps performed by a first network device in the methods in FIG. 1 to FIG. 8. To avoid repetition, details are not described herein again. The apparatus 1200 includes:

a memory 1210, configured to store a program;

a transceiver 1220, configured to communicate with another device; and a processor 1230, configured to: execute the program in the memory 1210, and when the program is executed, determine indication information of at least one of a plurality of carriers, where the indication information includes at least one piece of the following information: access probability information of the carrier, access control information of the carrier, overload indication information of the carrier, power boost information of the carrier, and access indication information of the carrier; and the processor 1230 is configured to send the indication information of the at least one carrier to user equipment by using the transceiver 1220. It should be understood that the apparatus 1200 may be specifically the network device in the foregoing embodiments, and may be configured to perform the steps and/or procedures corresponding to the network device in the foregoing method embodiments.

Therefore, by receiving the indication information sent by the network side and determining, based on the indication information, a carrier for performing random access, the user equipment can determine a target carrier from the plurality of carriers to perform random access, thereby facilitating load balancing.

It should be understood that in embodiments of the present application, the processor in the foregoing apparatus may be a central processing unit (CPU), or the processor may be another general-purpose processor, a digital signal processor (DSP), an application-specific integrated circuit (ASIC), a field programmable gate array (FPGA) or another programmable logic device, discrete gate or transistor logic device, discrete hardware component, or the like. The general-purpose processor may be a microprocessor, or the processor may be any conventional processor or the like.

In an implementation process, the steps in the foregoing methods can be implemented by using a hardware integrated logical circuit in the processor, or by using instructions in a form of software. The steps of the method disclosed with reference to embodiments of the present application may be directly performed by a hardware processor, or may be performed by using a combination of hardware in the processor and a software unit. The software unit may be located in a storage medium, such as a random access memory, a flash memory, a read-only memory, a programmable read-only memory, an electrically erasable programmable memory, or a register. The storage medium is located in the memory, and the processor executes instructions in the memory and completes the steps in the foregoing methods in combination with hardware of the processor. To avoid repetition, details are not described herein again.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve objectives of solutions of embodiments of the present application.

The term "and/or" in "A and/or B" means: "A, B, or A and B." In addition, the character "/" in "A/B" generally indicates "A or B".

In addition, functional units in embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of the present application may be implemented in the form of a software product. The computer software product is stored in a storage medium and includes several instructions for instructing a computer device (which may be a personal computer, a server, a network device, or the like) to perform all or some of the steps of the methods described in embodiments of the present application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary embodiments of the present application, and are not intended to limit the protection scope of the present application. Any modification or replacement readily figured out by a person skilled in the art within the technical scope disclosed in the present application may fall within the protection scope of the present application.

What is claimed is:

1. A communication method for a random access process, comprising:

receiving, by a communication apparatus, indication information from a network device, wherein the indication information comprises access probability information of each of a plurality of carriers; and determining, by the communication apparatus, based on the indication information, one carrier from the plurality of carriers as a target carrier for performing random access, wherein determining the target carrier further comprises: generating a random number a, where $0 \le a \le 1$; and selecting a carrier based on the random number a, wherein:

when $a \le P(1)$, a first carrier out of n carriers is selected as the target carrier to perform random access;

when $a = P(1)$, the first carrier or a second carrier out of the n carriers is selected as the target carrier to perform random access;

when $P(1) + \ldots + P(j) < a < P(1) + \ldots + P(j+1)$, a $(j+1)^{th}$ carrier out of the n carriers is selected as the target carrier to perform random access; and when $P(1) + \ldots + P(j) = a$, a $j^{th}$ carrier or the $(j+1)^{th}$ carrier in the n carriers is selected as the target carrier to perform random access;

where $P(i)$ is an access probability of an $i^{th}$ carrier in the n carriers, where $1 \le i \le n$, where $1 < j \le n$, and where n is a positive integer.

2. The method according to claim 1, wherein the indication information is carried in broadcast signaling.

3. The method according to claim 1, wherein the plurality of carriers comprises an anchor carrier.

4. The method according to claim 1, wherein a sum of access probabilities of the plurality of carriers is 1.

5. A communication method, comprising:

determining, by a communication apparatus, indication information, wherein the indication information comprises access probability information of each of a plurality of carriers; and sending, by the communication apparatus, the indication information to another communication apparatus to facilitate the other communication apparatus determining, based on the indication information, one carrier from the plurality of carriers as a target carrier for performing random access, wherein determining the target carrier further comprises: generating a random number a, where $0 \le a \le 1$; and selecting a carrier based on the random number a, wherein:

when $a \le P(1)$, a first carrier out of n carriers is selected as the target carrier to perform random access;

when $a = P(1)$, the first carrier or a second carrier out of the n carriers is selected as the target carrier to perform random access;

when $P(1) + \ldots + P(j) < a < P(1) + \ldots + P(j+1)$, a $(j+1)^{th}$ carrier out of then carriers is selected as the target carrier to perform random access; and when $P(1) + \ldots + P(j) = a$, a $j^{th}$ carrier or the $(j+1)^{th}$ carrier in the n carriers is selected as the target carrier to perform random access;

where $P(i)$ is an access probability of an $i^{th}$ carrier in the n carriers, where $1 \le i \le n$, where $1 < j \le n$, and where n is a positive integer.

6. The method according to claim 5, wherein the indication information is carried in broadcast signaling.

7. The method according to claim 5, wherein the plurality of carriers comprises an anchor carrier.

8. The method according to claim 5, wherein a sum of access probabilities of the plurality of carriers is 1.

9. A communication apparatus, comprising:

a receiver, configured to receive indication information from a network device, wherein the indication information comprises access probability information of each of a plurality of carriers; and a processor, configured to determine, based on the indication information, one carrier from the plurality of carriers as a target carrier for performing random access, wherein determining the target carrier further comprises: generating a random number a, where $0 \le a \le 1$; and selecting a carrier based on the random number a, wherein:

when $a \le P(1)$, a first carrier out of n carriers is selected as the target carrier to perform random access;

when $a = P(1)$, the first carrier or a second carrier out of the n carriers is selected as the target carrier to perform random access;

when $P(1) + \ldots + P(j) < a < P(1) + \ldots + P(j+1)$, a $(j+1)^{th}$ carrier out of then carriers is selected as the target carrier to perform random access; and when $P(1) + \ldots + P(j) = a$, a $j^{th}$ carrier or the $(j+1)^{th}$ carrier in the n carriers is selected as the target carrier to perform random access;

where $P(i)$ is an access probability of an $i^{th}$ carrier in the n carriers, where $1 \le i \le n$, where $1 < j \le n$, and where n is a positive integer.

10. The apparatus according to claim 9, wherein the indication information is carried in broadcast signaling.

11. The apparatus according to claim 9, wherein the plurality of carriers comprises an anchor carrier.

12. The apparatus according to claim 9, wherein a sum of the access probabilities of the plurality of carriers is 1.

13. A communication apparatus, comprising:

a processor, configured to determine indication information, wherein the indication information comprises access probability information of each of a plurality of carriers; and a transmitter, configured to send the indication information to another communication apparatus to facilitate the other communication apparatus determining, based on the indication information, one carrier from the plurality of carriers as a target carrier for performing random access, wherein determining the target carrier further comprises: generating a random number a, where $0 \le a \le 1$; and selecting a carrier based on the random number a, wherein:

when $a \le P(1)$, a first carrier out of n carriers is selected as the target carrier to perform random access;

when $a = P(1)$, the first carrier or a second carrier out of the n carriers is selected as the target carrier to perform random access;

when $P(1) + \ldots + P(j) < a < P(1) + \ldots + P(j+1)$, a $(j+1)^{th}$ carrier out of then carriers is selected as the target carrier to perform random access; and when $P(1) + \ldots + P(j) = a$, a $j^{th}$ carrier or the $(j+1)^{th}$ carrier in the n carriers is selected as the target carrier to perform random access;

where $P(i)$ is an access probability of an $i^{th}$ carrier in the n carriers, where $1 \le i \le n$, where $1 < j \le n$, and where n is a positive integer.

14. The apparatus according to claim 13, wherein the indication information is carried in broadcast signaling.

15. The apparatus according to claim 13, wherein the plurality of carriers comprises an anchor carrier.

16. The apparatus according to claim 13, wherein a sum of access probabilities of the plurality of carriers is 1.

* * * * *

UNITED STATES PATENT AND TRADEMARK OFFICE
CERTIFICATE OF CORRECTION

PATENT NO. : 10,939,410 B2  
APPLICATION NO. : 16/297130  
DATED : March 2, 2021  
INVENTOR(S) : Li et al.

Page 1 of 1

It is certified that error appears in the above-identified patent and that said Letters Patent is hereby corrected as shown below:

In the Claims

Claim 5: Column 25, Line 52: "carrier out of then carriers is selected as the target" should read -- carrier out of the n carriers is selected as the target --.

Claim 9: Column 26, Line 18: "carrier out of then carriers is selected as the target" should read -- carrier out of the n carriers is selected as the target --.

Claim 13: Column 26, Line 52: "carrier out of then carriers is selected as the target" should read -- carrier out of the n carriers is selected as the target --.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*